US012685990B2

(12) United States Patent
Hofstatter et al.

(10) Patent No.: US 12,685,990 B2
(45) Date of Patent: Jul. 21, 2026

(54) DEVICE FOR CONDUCTING A CHEMICAL REACTION IN A PROCESS FLUID IN A PRODUCTION FACILITY

(71) Applicants: Linde GmbH, Pullach (DE); BASF SE, Ludwigshafen (DE)

(72) Inventors: Martin Hofstatter, Munich (DE); Clara Delhomme-Neudecker, Munich (DE); Heinz Posselt, Bad Aibling (DE); Niklas Fleischmann, Munich (DE); Kiara Aenne Kochendorfer, Mannheim (DE); Eric Jenne, Hassloch (DE); Andrey Shustov, Ludwigshafen Am Rhein (DE); Werner Josef Still, Grüstadt (DE); Torsten Stark, Mannheim (DE)

(73) Assignees: Linde GmbH, Pullach (DE); BASF SE, Ludwigshafen (DE)

( * ) Notice: Subject to any disclaimer, the term of this patent is extended or adjusted under 35 U.S.C. 154(b) by 609 days.

(21) Appl. No.: 18/246,848

(22) PCT Filed: Sep. 10, 2021

(86) PCT No.: PCT/EP2021/074912
§ 371 (c)(1),
(2) Date: Mar. 27, 2023

(87) PCT Pub. No.: WO2022/063602
PCT Pub. Date: Mar. 31, 2022

(65) Prior Publication Data
US 2023/0398513 A1     Dec. 14, 2023

(30) Foreign Application Priority Data
Sep. 28, 2020    (EP) ..................................... 20198807

(51) Int. Cl.
*B01J 19/00* (2006.01)
*B01J 19/24* (2006.01)

(52) U.S. Cl.
CPC ......... *B01J 19/243* (2013.01); *B01J 19/0013* (2013.01); *B01J 2219/00135* (2013.01)

(58) Field of Classification Search
CPC .... B01J 19/243; B01J 19/0013; B01J 19/002; B01J 19/087; B01J 19/2425;
(Continued)

(56) References Cited

U.S. PATENT DOCUMENTS

| 1,985,680 A | 12/1934 | Mapes |
| 5,000,926 A | 3/1991 | Murayama et al. |

(Continued)

FOREIGN PATENT DOCUMENTS

| CN | 101150894 A | 3/2008 |
| CN | 201565295 U | 9/2010 |

(Continued)

OTHER PUBLICATIONS

International Search Report and Written Opinion issued in related App. No. PCT/EP2021/074912, mailed Dec. 6, 2021.
(Continued)

*Primary Examiner* — Dapinder Singh
(74) *Attorney, Agent, or Firm* — Avek IP, LLC

(57) ABSTRACT

An apparatus for carrying out a chemical reaction in a process fluid includes a reactor comprising one or more reaction tubes which have a number of electrically heatable tube segments which are connected to one another by an electrically conductive star bridge, and at least one power source configured to provide a multiphase alternating current with N phases to N phase lines at a predetermined voltage. N is an integer greater than or equal to 2. For each of the at least one power source, a number of power
(Continued)

connections is provided, each of which is connected to at least one of the tube segments and to one of the phase lines of the power source. In the at least one power source, a star point is formed at which the phase lines of the power source are connected, wherein the star point is not connected to a ground connection.

20 Claims, 3 Drawing Sheets

(58) Field of Classification Search
CPC .......... B01J 19/0809; B01J 2208/00415; B01J 2208/00628; B01J 2208/00389; B01J 2208/00638; B01J 2208/00637; B01J 8/067; B01J 8/001; B01J 2219/00135; B01J 2219/00132; B01J 2219/00245; B01J 2219/00263; B01J 2219/00268; B01J 2219/00272; Y02P 20/54
See application file for complete search history.

(56) References Cited

U.S. PATENT DOCUMENTS

| | | | |
|---|---|---|---|
| 5,204,071 A | 4/1993 | Carter et al. | |
| 6,191,332 B1 | 2/2001 | Duee et al. | |
| 6,296,814 B1 | 10/2001 | Bonk et al. | |
| 6,402,988 B1 * | 6/2002 | Gottzmann | C01B 3/384 |
| | | | 423/652 |
| 7,371,361 B2 | 5/2008 | Singh et al. | |
| 7,462,209 B2 | 12/2008 | Berggren et al. | |
| 7,667,072 B2 | 2/2010 | Yada et al. | |
| 7,846,417 B2 | 12/2010 | Singh et al. | |
| 9,011,560 B2 * | 4/2015 | Simmons | C10J 3/84 |
| | | | 48/197 R |
| 9,295,961 B2 * | 3/2016 | Laska | B01J 8/0025 |
| 9,347,596 B2 | 5/2016 | Wortmann et al. | |
| 9,908,091 B2 | 3/2018 | Vogel et al. | |
| 10,676,354 B2 * | 6/2020 | Finnerty | B01J 23/26 |
| 11,958,047 B2 * | 4/2024 | Van Der Ploeg | B01J 8/067 |
| 2004/0015012 A1 | 1/2004 | Hammon et al. | |
| 2006/0089519 A1 | 4/2006 | Stell et al. | |
| 2010/0105944 A1 | 4/2010 | Buturla et al. | |
| 2012/0241677 A1 * | 9/2012 | Perkins | C10J 3/506 |
| | | | 252/373 |
| 2012/0328269 A1 | 12/2012 | Ellinger et al. | |
| 2014/0238523 A1 | 8/2014 | Wortmann et al. | |
| 2015/0010467 A1 | 1/2015 | Ito et al. | |
| 2015/0122802 A1 | 5/2015 | Zikeli et al. | |
| 2016/0288074 A1 | 10/2016 | Vogel et al. | |
| 2017/0130887 A1 | 5/2017 | Eder et al. | |
| 2018/0208525 A1 | 7/2018 | Schoonebeek et al. | |
| 2019/0002389 A1 | 1/2019 | Horstmann et al. | |
| 2020/0299131 A1 | 9/2020 | Finnerty et al. | |
| 2021/0071007 A1 | 3/2021 | Hardman et al. | |
| 2021/0179948 A1 | 6/2021 | Kochendoerfer et al. | |
| 2023/0115461 A1 | 4/2023 | Zellhuber et al. | |
| 2023/0116690 A1 | 4/2023 | Posselt et al. | |
| 2023/0211305 A1 | 7/2023 | Hofstätter et al. | |
| 2023/0226511 A1 | 7/2023 | Hofstätter et al. | |
| 2023/0285929 A1 | 9/2023 | Posselt et al. | |
| 2023/0302426 A1 | 9/2023 | Zellhuber et al. | |
| 2023/0356176 A1 | 11/2023 | Lang et al. | |
| 2023/0398513 A1 | 12/2023 | Hofstatter et al. | |
| 2024/0100498 A1 | 3/2024 | Hofstatter et al. | |
| 2024/0123421 A1 | 4/2024 | Zellhuber et al. | |
| 2024/0207811 A1 | 6/2024 | Zellhuber et al. | |

FOREIGN PATENT DOCUMENTS

| | | | |
|---|---|---|---|
| CN | 104115391 A | 10/2014 | |
| CN | 208878600 U | 5/2019 | |
| CN | 110073560 A | 7/2019 | |
| CN | 111578710 A | 8/2020 | |
| CN | 112368235 A | 2/2021 | |
| DE | 2362628 A1 | 6/1975 | |
| DE | 102006054156 A1 | 5/2008 | |
| DE | 102011077970 A1 | 12/2012 | |
| DE | 102015004121 A1 | 10/2016 | |
| DE | 102018132736 A1 | 6/2020 | |
| EP | 0399833 A1 | 11/1990 | |
| EP | 0792683 A2 | 9/1997 | |
| EP | 1043367 A1 | 10/2000 | |
| EP | 1273552 A2 | 1/2003 | |
| EP | 2805762 A1 | 11/2014 | |
| EP | 3075704 A1 | 10/2016 | |
| EP | 3153466 A1 | 4/2017 | |
| EP | 3862076 A1 | 8/2021 | |
| EP | 3900817 A1 | 10/2021 | |
| EP | 4056892 A1 | 9/2022 | |
| JP | S49010026 A | 1/1974 | |
| JP | S5223246 A | 2/1977 | |
| JP | S57144840 A | 9/1982 | |
| JP | S6099951 A | 6/1985 | |
| JP | S60191444 A | 9/1985 | |
| JP | H05317843 A | 12/1993 | |
| JP | H06104187 A | 4/1994 | |
| JP | H1053775 A | 2/1998 | |
| JP | H1094727 A | 4/1998 | |
| JP | H11130541 A | 5/1999 | |
| JP | 2006261362 A | 9/2006 | |
| JP | 2008221093 A | 9/2008 | |
| JP | 2009526734 A | 7/2009 | |
| JP | 2011258392 A | 12/2011 | |
| JP | 2013067537 A | 4/2013 | |
| JP | 2016087512 A | 5/2016 | |
| PL | 175410 B1 | 5/1995 | |
| RU | 2173213 C1 | 9/2001 | |
| WO | 1997015983 | 5/1997 | |
| WO | 2004091773 A1 | 10/2004 | |
| WO | 2015069762 A2 | 5/2015 | |
| WO | 2015123578 A1 | 8/2015 | |
| WO | 2015197181 A1 | 12/2015 | |
| WO | 2017072057 A1 | 5/2017 | |
| WO | 2019133215 A1 | 7/2019 | |
| WO | 2019228798 A1 | 12/2019 | |
| WO | 2020002326 A1 | 1/2020 | |
| WO | 2020035575 A1 | 2/2020 | |
| WO | 2022214622 A1 | 10/2022 | |

OTHER PUBLICATIONS

Notice of Opposition received in Application No. EP21719925.6, dated Jul. 25, 2024.
Substantive examination report with English description, dated Aug. 15, 2024, 10 pages, issued in Saudi Arabia Application No. 523450274.
Waitz and Wubben "Resistance heated furnaces for protective gas and vacuum operation" from Heat Processing (9), Issue 1, 2011, p. 29-38.
Badini, C. and Laurella, F., Oxidation of FeCrAl alloy: influence of temperature and atmosphere on scale growth rate and mechanism, Surface and Coatings Technology, 2001, vol. 135, Issues 2-3, 291-298.
Office Action issued Apr. 7, 2026 in JP Application No. 2023-547828, 5 pages.
Office Action issued Apr. 7, 2026 in JP Application No. 2023-561056, 3 pages.

* cited by examiner

DEVICE FOR CONDUCTING A CHEMICAL REACTION IN A PROCESS FLUID IN A PRODUCTION FACILITY

CROSS-REFERENCE TO RELATED APPLICATIONS

This application is the national phase of, and claims priority to, International Application No. PCT/EP2021/074912, filed Sep. 10, 2021, which claims priority to European Application No. 20198807.8, filed Sep. 28, 2020.

FIELD OF THE INVENTION

The invention relates to an apparatus for carrying out a chemical reaction in a process fluid in a production system; the invention in particular relates to the grounding of the apparatus.

BACKGROUND

In a series of processes in the chemical industry, reactors are used in which one or more reactants are conducted through heated reaction tubes and are catalytically or non-catalytically converted there. The heating serves in particular to overcome the activation energy requirement for the chemical reaction taking place. The reaction can proceed endothermically overall or exothermically after overcoming the activation energy requirement. The invention relates in particular to strongly endothermic reactions.

Examples of such processes are steam cracking, different reforming processes, in particular steam reforming, dry reforming (carbon dioxide reforming), mixed reforming processes, processes for dehydrogenating alkanes and the like. In steam cracking, the reaction tubes are guided through the reactor in the form of tube coils, which have at least one U-bend in the reactor, whereas tubes which typically extend through the reactor without U-bends are used in steam reforming.

The invention is suitable for all such processes and embodiments of reaction tubes. Merely illustratively, reference is made to the articles "Ethylene," "Gas Production," and "Propenes" in Ullmann's Encyclopedia of Industrial Chemistry, for example the publications of Apr. 15, 2009, DOI: 10.1002/14356007.a10_045.pub2, of Dec. 15, 2006, DOI: 10.1002/14356007.a12_169.pub2, and of Jun. 15, 2000, DOI: 10.1002/14356007.a22_211.

The reaction tubes of corresponding reactors are conventionally heated by using burners. The reaction tubes are guided through a combustion chamber in which the burners are also arranged.

However, as described, for example, in DE 10 2015 004 121 A1 (likewise EP 3 075 704 A1), the demand for synthesis gas and hydrogen, which are produced without or with reduced local carbon dioxide emissions, is currently increasing. However, processes in which fired reactors are used cannot meet this demand on the basis of the burning of typically fossil energy carriers. Other processes are rejected due to high costs, for example. The same also applies to the provision of olefins and/or other hydrocarbons by steam-cracking or dehydrogenating alkanes. In such cases too, there is a desire for processes which emit lower amounts of carbon dioxide at least on site.

Against this background, the cited DE 10 2015 004 121 A1 proposes electrical heating of a reactor for steam reforming, in addition to firing. Here, one or more voltage sources are used, which provide(s) a three-phase alternating voltage on three outer conductors. Each outer conductor is connected to a reaction tube. A star connection is formed, in which a star point is realized by a collector into which the tube lines open and to which the reaction tubes are conductively connected. In this way, the collector ideally remains potential-free. WO 2015/197181 A1 likewise discloses a reactor whose reaction tubes are arranged in a star-point connection.

The process medium is fed to the reactor or discharged from the reactor via feed sections and discharge sections, which are sections of the reaction tubes. Feed sections and discharge sections, as sections of the reaction tubes, are connected to the tube sections (tube segments) which serve the heating by electrical current. Since, due to the process media used and the high process temperatures, the use of electrically insulating materials, such as plastics or ceramics, is not possible or is only possible with difficulty for the feed sections and discharge sections, there is the problem that electrical currents can be conducted outside the reactor via these sections into the production system in which the reactor is used, and there can lead to damage to other parts of the production system and to hazards for humans, in particular since the above-described ideal case of a potential-free collector cannot always be achieved.

SUMMARY

According to an embodiment of the invention, an apparatus for carrying out a chemical reaction in a process fluid in a production system having at least one ground connection connected to ground for grounding production system components includes a reactor and at least one power source. The reactor includes one or more reaction tubes which are guided into the reactor and out of the reactor via at least one feed section and at least one discharge section. Each reaction tube has at least one electrically heatable tube segments which is/are connected to one another in a current output area by an electrically conductive star bridge. The at least one power source is configured to provide a multiphase alternating current with N phases to N phase lines at a predetermined voltage. N is an integer greater than or equal to 2. For each two phases, a phase shift between the two phases is $2\pi \cdot k/N$, where k is in each case an integer in the range of 1 to N−1. For each of the at least one power source, a number N of power connections is provided, each of which is connected to a respective tube segment in a current input area. Each of the power connections is connected to one of the phase lines of the power source. In the at least one power source, a sear point is formed at which the phase lines of the power source are connected. The star point is not connected to a ground.

WRITTEN DESCRIPTION

Figure 1:
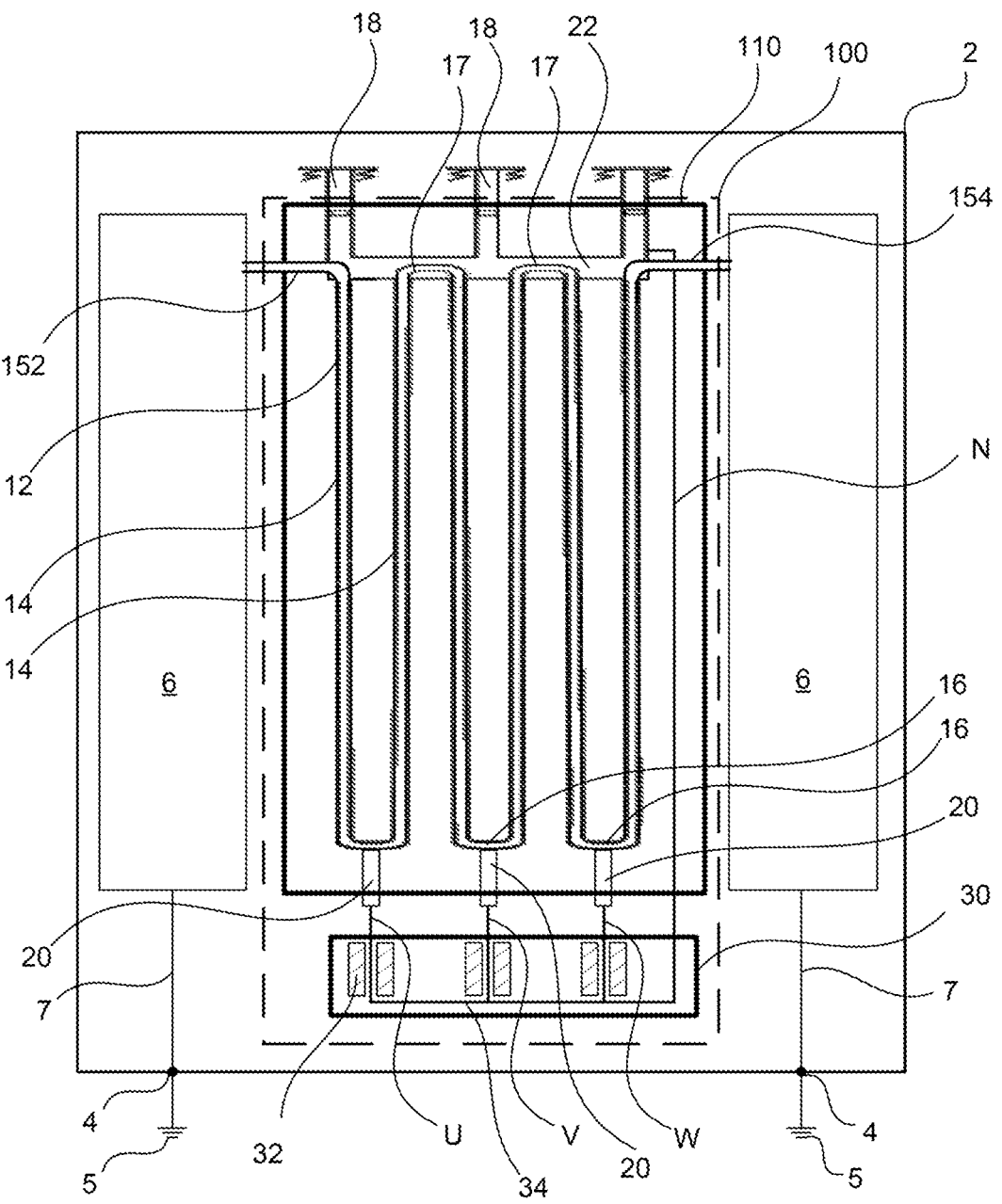
FIG. 1 shows an apparatus according to a preferred embodiment of the invention.

According to the invention, the star point of the power source is not grounded. Thus, if there is a potential difference between the star point and the feed sections or discharge sections, this cannot lead to a current flow from the feed sections or discharge sections via the production system to ground and from there to the star point, which is dangerous (electrical safety/explosion protection) or damaging (corrosion/device defects) for the production system.

The apparatus for carrying out a chemical reaction in a process fluid in a production system having at least one ground connection connected to ground for grounding production system components comprises a reactor and at least one power source. The reactor has one or more reaction tubes which are routed into the reactor and out of the reactor via at least one feed section and at least one discharge section respectively, and which have a number of electrically heatable tube segments which are connected to one another in a current output area by an electrically conductive star bridge. In particular, the process fluid is fed via the feed sections to the reactor or the reaction tubes and discharged from the reactor or the reaction tubes via the discharge sections. The at least one power source is configured to provide a multiphase alternating current with N phases to N phase lines with a predetermined voltage, wherein N is an integer greater than or equal to 2, and wherein for each two phases, a phase shift between the two phases is $2\pi \cdot k/N$, where k is in each case an integer in the range of 1 to N−1. For each of the at least one power source, a number N of power connections is provided, each of which is connected to at least one of the tube segments in a current input area, wherein each of the power connections is connected to one of the phase lines of the power source. In the at least one power source, a star point is formed at which the phase lines of the power source are connected, wherein the star point is not connected to a ground connection (i.e., the star point is not grounded).

The chemical reaction can be a chemical reaction that proceeds at least partially at a temperature in the range of 200° C. to 1700° C., in particular of 300° C. to 1400° C. or of 400° C. to 1100° C. The chemical reaction is preferably a chemical reaction that proceeds at least partially at a temperature of at least 500° C., more preferably of at least 700° C., in particular at least partially in a temperature range of 500° C. or 700° C. to 1100° C. The provided electrical voltages/currents are accordingly suitable for providing corresponding heating powers. The reactor and the power source are likewise configured to carry out chemical reactions at these temperatures and to provide corresponding heating powers. Preferably, the chemical reaction is one of the following: steam cracking, steam reforming, dry reforming (carbon dioxide reforming), propane dehydrogenation, generally reactions with hydrocarbons that are carried out at least partially at over 500° C.

In this case, a production system is understood to mean an in particular industrial system in which process media or process fluids are subjected to chemical reactions. This system may, for example, be arranged in a production building. In addition to the apparatus according to the invention for carrying out a chemical reaction, the production system generally includes further system parts (or other system parts, i.e., system parts different from the apparatus), which inter alia are system parts in which the process fluid is pre-processed and from which the process fluid is fed via the feed sections to the reactor or reaction tube, i.e., is conducted into the reactor or reaction tube, and system parts in which the process fluid is post-processed and into which the process fluid is discharged via the discharge sections from the reactor or reaction tube, i.e., away from which it is conducted.

The production system comprises ground connections which serve to ground parts of the system (i.e., the apparatus according to the invention and further system parts) by connecting the parts of the system to a ground connection via an electrical line.

Preferably N=3, i.e., a three-phase alternating current, a so-called three-phase current, is used. Successive phases are then in each case shifted by $2\pi/3$ (corresponding to 120°). The use of three-phase alternating current enables, in particular, a connection to public supply networks.

Preferably, a neutral conductor is provided which connects the star bridge to the ungrounded star point of the power source. A possible potential difference between the star bridge and the star point of the power source, which can arise due to an asymmetrical load on the phases, can thus be partially compensated (taking into account the resistance of the neutral conductor).

Preferably, the star bridge is not connected to a ground connection. Thus dangerous (electrical safety/explosion protection) or damaging (corrosion/device defects) electrical currents also cannot occur through further system parts from the location of the star bridge, to which a line to a ground connection is attached, via ground, ground connections of the further system parts, and feed or discharge sections which are electrically conductively connected to the further system parts.

Furthermore, a main grounding rail is preferably provided and the feed sections and the discharge sections are electrically conductively connected to this main grounding rail. This is expedient since potential equalization between feed sections and discharge sections can take place via the main grounding rail and possible current flows via further system parts are thus at least reduced. The main grounding rail, which is electrically conductively connected to ground, is provided in particular in the production system, wherein one or more of the ground connections are provided on the main grounding rail (these ground connections are thus indirectly connected to ground via the main grounding rail).

Preferably, the feed sections and the discharge sections are arranged spatially adjacent to one another and are electrically conductively connected to one another by an (electrically conductive) connecting element. Due to the spatial extent of the reactor and in particular of the star bridge (which can in each case be several meters), potential differences can occur on different sides of the reactor or of the star bridge. By arranging the feed sections and the discharge sections adjacently, these potential differences are prevented from manifesting as different potentials of feed sections and discharge sections, which could lead, for example, to an undesired current flow from the feed sections via the production system to the discharge sections. The additional conductive connection via the connecting element achieves direct potential equalization between feed sections and discharge sections without indirect potential equalization by a current flow via the production system.

It should be pointed out here that, when a potential equalization is referred to here, this potential equalization may of course not be complete due to the non-zero resistances of electrical conductors. In terms of circuitry, the elements via which potential equalization takes place (e.g., connecting element) form resistances, like the further system parts and ground also form resistances. The resistances of the elements via which potential equalization can take place are, however, very low in contrast to current paths via the further system parts, so that essentially no current flow takes place via the latter.

More preferably, a distance between adjacent feed sections and discharge sections is less than one tenth of a dimension of the star bridge. Possible dimensions are preferably as follows: a distance between adjacent feed sections and discharge sections is less than 10 cm, preferably less than 5 cm. Due to these small dimensions, in general there can be only a relatively small potential difference (compared to the maximum potential difference over the entire extension of the star bridge). The dimension of the star bridge may, for example, be the diameter of the smallest sphere (i.e., the sphere with the smallest diameter) that completely encloses the star bridge.

The connecting element is preferably connected to a ground connection via a ground connection line. In particular when the star bridge is not grounded, the electrically conductive connection of the connecting element to a ground connection leads, in terms of circuitry, to a "single-point" grounding of the apparatus from the point of view of the further system parts. In fact, the apparatus is grounded exactly at the single location at which the further system parts are electrically conductively connected to the apparatus via the feed sections and discharge sections. Neither the power source nor the consumer (reactor, reaction tubes) is grounded (directly). That is to say, from the point of view of the further system parts, the apparatus according to the invention is connected in terms of circuitry (in the sense of an electrical circuit) only at this one point which is grounded; other, direct or indirect electrical connections do not exist. "Point" here is clearly to be understood not in the sense of a zero-dimensional geometric point but rather in the electrotechnical sense of an electrical connection point (of a geometric extension that is as small as possible).

Preferably, the electrically conductive connecting element is manufactured in one piece, in particular as a cast component, wherein the connecting element is more preferably manufactured in one piece with the tube inlet sections and the tube outlet sections. If the connecting element is manufactured as a cast component, one end of the ground connection line is preferably cast into the cast component. These measures advantageously lead to low resistances between the individual elements, wherein in particular no contact resistances occur between the elements.

The invention is schematically represented in the drawings using exemplary embodiments and is described below with reference to the drawings. In the figures, elements corresponding structurally or functionally to one another are indicated by identical or similar reference signs and, for the sake of clarity, are not explained repeatedly. For the sake of clarity, elements occurring multiple times in a figure are provided with a reference sign only once or twice.

FIG. 1 shows an apparatus 100 according to a preferred embodiment of the invention installed in a production system 2. The apparatus 100 comprises a reactor 110 for carrying out a chemical reaction in a reaction medium or process fluid flowing through a reaction tube 12, which is electrically heated, and a power source which provides the electric current required for electrical heating at a suitable voltage.

One or more grounding points or ground connections 4, which are electrically conductively connected to ground 5, are provided in the production system 2. Parts (apparatus according to the invention, further system parts) of the production system are grounded via these ground connections. Typically, the production system has a concrete base plate on which the parts of the system are installed. The ground connections are then provided on this base plate, wherein electrical conductors (for example, an electrically conductive metal strip or cable) are guided from the ground connections through the base plate into ground or even into water (river water). One or more of these ground connections can be connected together via a grounding rail, i.e., a so-called main grounding rail (not shown), which is connected to ground, so that, in a manner of speaking, indirect grounding takes place via the main grounding rail. Furthermore, the production system 2 has, in addition to the reactor 110, further system parts 6 (shown merely symbolically by rectangles), in which in particular pre-processing and post-processing of the process fluid take place. The further system parts are connected to ground connections via ground lines 7.

The reactor 110 comprises one or more reaction tubes 12 (only one is shown here) in which the chemical reaction of the process fluid is carried out by heating it. The rector 110 preferably has a thermal insulation, for example in the form of a thermally insulating reactor wall. The reaction tube 12 shown has the shape of a tube coil, which is guided from a feed section 152, through which the process fluid is fed to the reaction tube or the reactor, via tube segments 14 and tube bends 16, 17, which together form the tube coil, to a discharge section 154, through which the process fluid is discharged (conducted away) from the reaction tube or reactor. The feed section 152 and the discharge section 154 thus connect the reactor 110 electrically conductively to further system parts 6 in which, in particular, the process fluid is provided and pumped through the reactor tube or further processed after the chemical reaction. If a reactor wall is provided, this feed section 152 and this discharge section 154 extend substantially through it.

The material used for the reaction tube(s) is a material with an electrical conductivity suitable for electrical heating of the reaction tube(s), for example heat-resistant steel alloys, in particular heat-resistant chromium-nickel-steel alloys. The feed sections and discharge sections, as parts of the reaction tube(s), are thus electrically conductive. Such steel alloys can likewise be used for the power connections (via which the electrical currents are conducted into the reactor container) and for the connection bridge (which is arranged at least partially in the reactor container). For example, materials with the standard designations GX40CrNiSi25-20, GX40NiCrSiNb35-25, GX45NiCrSiNbTi35-25, GX35CrNiSiNb24-24, GX45NiCrSi35-25, GX43NiCrWSi35-25-4, GX10NiCrNb32-20, GX50CrNiSi30-30, G-NiCr28W, G-NiCrCoW, GX45NiCrSiNb45-35, GX13NiCrNb45-35, GX13NiCrNb37-25, or GX55NiCrWZr33-30-04 in accordance with DIN EN 10027, Part 1, "Materials," can be used.

In the case of a plurality of reaction tubes, for example in the form of a package that comprises, as shown in the figure, a plurality of reaction tubes or tube coils, which are in each case arranged parallel to and at a distance from one another perpendicularly to the drawing plane, a separate feed section and a separate discharge section can be provided for each reaction tube. However, it is preferred to guide at least some (in particular even all) of the plurality of reaction tubes into the reactor via a common feed section and/or to guide them out of the reactor via a common discharge section. These some (or all) reaction tubes are then connected in the reactor via a distributor tube arrangement to the common feed section and/or via a distributor tube arrangement to the common discharge section. In the case of the above-mentioned arrangement in the form of a package, tubes of the distributor tube arrangement accordingly extend perpendicularly to the drawing plane. These distributor tube arrangements are also referred to as headers.

In addition to tube coils, the reaction tubes can of course also be guided through the reactor in another form, for example, each reaction tube can have a U-shape in the reactor, or only straight reaction tubes can be provided, wherein in these tubes are in any case connected via distributor tube arrangements to one or more feed sections and one or more discharge sections. Different power connections (and accordingly different phase lines) are then connected to different reaction tubes.

The electrical heating of the reaction tube 12 takes place via the tube segments 14 through which an electrical current (more precisely an alternating current) flows, wherein the current is fed into the tube segments 14 in a current input area and is discharged from the tube segments 14 in a current output area. For this purpose, the tube segments 14 are electrically conductively connected in the current input area to power connections 20 and are electrically conductively connected in the current output area to an (electrically conductive) star bridge 22. Each of the power connections 20 is connected to one or more of the tube segments 14 (obviously a single tube segment should not be connected simultaneously to a plurality of power connections). The electrical current is provided as alternating current, wherein different power connections are connected to different phases, cf. the description of the power source 30 further below.

The current input area is formed in the figure by the lower tube bends 16, which are electrically conductively connected to corresponding power connections 20 (for example, bus bars which are guided into the reactor), i.e., are in electrically conductive contact with them (starting from the power connections, the current is thus fed into the tube segments indirectly via the lower tube bends). The current output area is formed in the figure by the upper tube bends 17, which are electrically conductively connected to the star bridge 22 (the current is thus discharged indirectly via the upper tube bends). Lower/upper in this respect only relates to the arrangement in the figure, the actual arrangement may be different. In deviation therefrom, the power connections and/or the star bridge can also be electrically conductively connected directly to the tube segments, for example via corresponding sleeves which enclose the tube segments.

Furthermore, the reactor 110 or the reaction tube 12 is supported, by way of example, by means of suspensions 18 by a support device (not shown in further detail) of the production system. The suspensions 18 are connected here via an electrical (and thermal) insulation to the star bridge 22, which in turn is connected to the reaction tube 12 and thus supports the latter. A different support arrangement is also conceivable here, wherein a suitable electrical and thermal insulation must be ensured in each case.

The power source 30 is designed as an alternating power source, which provides multiphase, here three-phase, alternating current at a predetermined alternating voltage. More generally, a different number N of phases is also conceivable. The phase shifts between the phases are selected such that the voltages or currents cancel one another out at a star point, i.e., the phase shift between two arbitrary phases can be expressed as a radian measure as $2\pi \cdot k/N$, or in degrees as $360° \cdot k/N$, where k is an integer in the range of 1 to N−1. In the case of three phases, therefore $2\pi/3$ or $4\pi/3$, corresponding to 120° or 240°. The phase difference between two successive phases is obtained with k=1, i.e., as $2\pi/N$.

The power source 30 is designed as an alternating current transformer, in particular as a high-current transformer. The primary side, i.e., the alternating current supply to the power source 30, for example from a public supply network or a generator, is shown here merely in the form of shaded boxes which symbolize primary-side transformer coils 32. Primary-side power supply lines are not shown in the figure. A primary-side alternating voltage can typically be a few hundred to a few thousand volts, e.g., 400 V, 690 V or 1.2 kV. Between the primary side of the power source 30 and a possibly public supply network or a generator, at least one further transformer (not shown) (possibly at least one regulating transformer) may be interposed in order to obtain a suitable input voltage for the high-current transformer. Instead of or in addition to this interposed, at least one transformer, the input voltage can also be set by means of one or more thyristor power controllers.

On the secondary side, phase lines U, V, W are provided, on which the phases of the alternating current are provided. The phase lines U, V, W are supplied with electrical energy via secondary-side transformer coils not shown in detail (it is only shown that the phase lines extend through the primary-side transformer coils 32, in order to indicate that they electromagnetically interact with one another). The secondary-side alternating voltage can expediently lie in the range up to 300 V, for example less than 150 V or less than 100 V, even less than or equal to 50 V. The secondary side is galvanically separated from the primary side.

The phase lines U, V, W are connected to one another in the power source 30 so that a star point 34 of the power source 30 is formed. Grounding of this star point 34 is dispensed with. That is to say, the star point 34 of the power source is electrically insulated from the ground connections 4 of the production system 2; there is thus no connection via an electrical conductor to the ground connections (and no other connection to ground is provided via an electrical conductor).

The phase lines U, V, W are connected to associated, different power connections 20. A multiphase alternating current is thus fed into the tube segments connected to the power connections, wherein different phases of the alternating current are fed into tube segments that are connected via respective power connections to different phase lines. For this multiphase alternating current, which flows through the tube segments 14, the star bridge 22 forms a star point (star point of the reactor) in terms of circuitry so that there, ideally, in the case of a symmetrical load, the currents or voltages cancel one another out.

Furthermore, a neutral conductor N is provided, which electrically conductively connects the two star points to one another, i.e., which is connected on the one hand to the star point 34 of the power source 30 and, on the other hand, is connected to the star bridge 22 (star point of the reactor).

Although only one power source is shown, a plurality of power sources can also generally be provided, in particular if a plurality of reaction tubes are provided. Different power sources can then be connected, for example, to different reaction tubes or to different subsets of the reaction tubes.

Since the different phases of the power source are generally loaded asymmetrically (for example, tube segments connected to different phase lines can have different electrical resistances due to different temperatures), a potential difference can arise between the star bridge 22 and the star point 34 of the power source. This potential difference is partially compensated by the neutral conductor N; however, since the neutral conductor has a finite (i.e., non-zero) resistance, a certain potential difference generally remains.

In terms of circuitry, the reaction tube is electrically conductively connected via the feed section 152 and the discharge section 154, with a specific resistance, to further or other system parts 6 of the production system 2. The further system parts 6 are in turn connected via ground lines 7 to ground connections 4 and thus to ground 5. However, since the star point 34 of the power source is not grounded (and is galvanically separated from the primary side), no current flow from the star bridge 22 via the further system parts 6 to ground 5 and from there to the star point 34 of the power source can occur. That is to say, an electrical current flow that may be caused by the potential difference, through the further system parts 6, which can lead to damage or hazards there, can be avoided or at least reduced.

Figure 2:
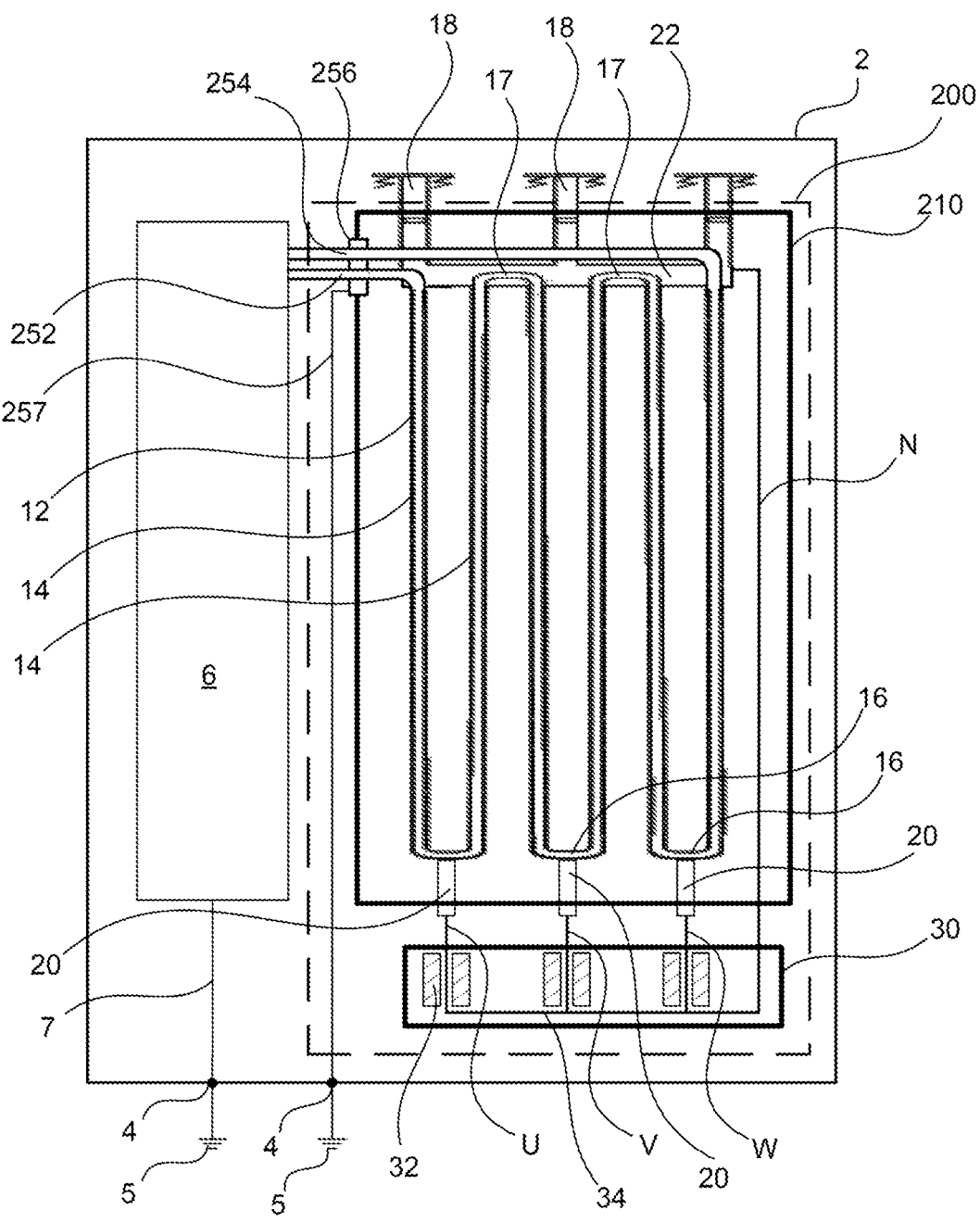
FIG. 2 shows an apparatus according to a further preferred embodiment of the invention.

FIG. 2 shows an apparatus 200 according to a further embodiment of the invention, which is again shown together with a production system 2 in which the apparatus is installed. In essential parts, the apparatus 200 shown in FIG. 2 resembles the apparatus 100 shown in FIG. 1. For the sake of simplicity, a description of already described elements (in particular of the power source and of the electrical heating of the tube segments) is not repeated, but reference is made in this respect to FIG. 1; the same reference symbols as in FIG. 1 are also used for these elements. The apparatus 200 comprises a reactor 210 and a power source 30.

In the reactor 210 of the apparatus 200, the feed section 252 and the discharge section 254 are arranged in spatial proximity to one another and are electrically conductively connected to one another (in contrast to the apparatus 100 of FIG. 1). As a result, differences between the electrical potential at the feed section 252 and the electrical potential at the discharge section 254 are reduced, which differences could lead to an electrical current in the further system parts 6, which current flows between the feed section 252 and the discharge section 254 via these further system parts. Such different potentials can exist between different areas of the star bridge, the material of which has a non-vanishing electrical resistance, due to its spatial extension (which can, for example, be a few meters; in this sense, the star bridge does not form a star "point") and is transmitted to the feed sections and discharge sections when they are not arranged spatially close to one another.

"Spatially close" can here be specified in the sense of an extension relative to the spatial extension of the star bridge (e.g., an average dimension or a maximum dimension); for example, the distance between adjacent feed sections and discharge sections should at most be one tenth of the spatial extension of the star bridge. Likewise, an absolute distance may be specified, e.g., the distance between adjacent feed sections and discharge sections should be less than 10 cm, preferably less than 5 cm.

In FIG. 2, the feed section 252 and the discharge section 254 are connected to one another by an electrically conductive connecting element 256 so that any potential differences between the feed section and the discharge section are compensated for, the risk of an electrical current flowing through the further system parts 6 thus being reduced. This connecting element 256 is connected via a ground line 257 to a ground connection of the production system 2. Since no further grounding of the reactor is provided, in particular the star point 34 of the power source is not grounded, this grounding represents the only grounding via the connecting element 256, and a single-point grounding is thus realized in terms of circuitry.

In FIG. 2, the connecting element 256 is located substantially on or at the height of the reactor wall, but it is also possible to arrange the connecting element outside the reactor, for example outside a possible reactor wall, or within the reactor.

Figure 3:
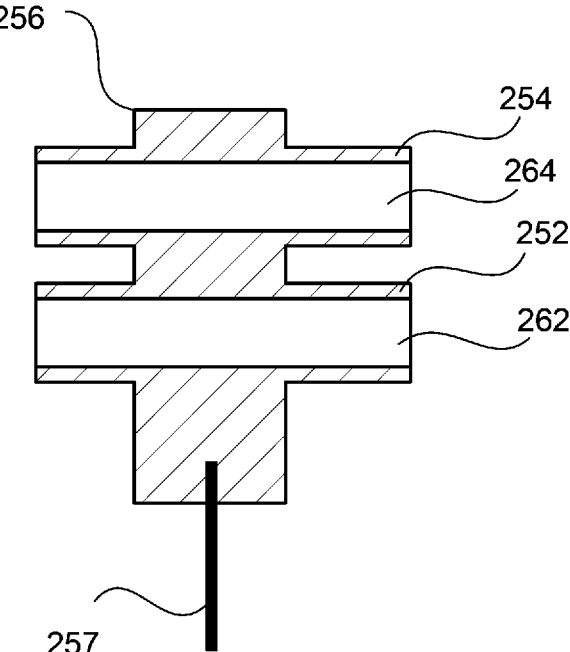
FIG. 3 shows a cross-sectional view of a connecting element that may be used in the embodiment of FIG. 2.

A preferred embodiment of the connecting element 256 is shown in FIG. 3. According to this embodiment, the connecting element 256 is produced, in particular cast, in one piece with the feed section 252 and the discharge section 254, wherein the connecting piece is electrically conductively connected to a ground connection line 257. More preferably, as shown, one end of the ground connection line (e.g., an electrically conductive metal strip) is cast into the connecting element. Alternatively, the feed sections and discharge sections can be guided as tube sections through the openings 262, 264 in the connecting element 256; for this purpose, for example, the connecting element can first be heated and (during subsequent cooling) be shrunk onto the feed sections and discharge sections in order to achieve good electrical contact. It is pointed out that the geometric arrangement of the elements, as shown in FIG. 3, is for illustration purposes only and does not restrict the scope of protection; i.e., in an actual embodiment, the geometric arrangement can differ from that shown in FIG. 3. Likewise, the relative dimensions shown of the individual elements are only by way of example and can generally be different in an actual embodiment.

The invention claimed is:

1. An apparatus for carrying out a chemical reaction in a process fluid in a production system having at least one ground connection connected to ground for grounding production system components, comprising:

a reactor, comprising one or more reaction tubes which are guided into the reactor and out of the reactor via at least one feed section and at least one discharge section, each reaction tube comprising at least one electrically heatable tube segments which is/are connected to one another in a current output area by an electrically conductive star bridge; and at least one power source configured to provide a multiphase alternating current with N phases to N phase lines at a predetermined voltage, wherein N is an integer greater than or equal to 2, and wherein for each two phases, a phase shift between the two phases is $2\pi \cdot k/N$, where k is in each case an integer in the range of 1 to N−1;

wherein;

for each of the at least one power source, a number N of power connections is provided, each of which is connected to a respective tube segment in a current input area, wherein each of the power connections is connected to one of the phase lines of the power source;

in the at least one power source, a star point is formed at which the phase lines of the power source are connected; and the star point is not connected to a ground connection.

2. The apparatus according to claim 1, wherein the chemical reaction is a chemical reaction that proceeds at least partially at a temperature of at least 500° C.; wherein the chemical reaction is selected from the list consisting of: steam cracking, steam reforming, dry reforming, propane dehydrogenation, a reaction with hydrocarbons, which is carried out at least partially at more than 500° C.

3. The apparatus according to claim 1, wherein a neutral conductor is provided that connects the star bridge to the star point.

4. The apparatus according to claim 1, wherein the star bridge is not connected to a ground connection.

5. The apparatus according to claim 1, further comprising a main grounding rail, the feed sections and the discharge sections being electrically conductively connected to the main grounding rail.

6. The apparatus according to claim 1, wherein the feed sections and the discharge sections are arranged spatially adjacent to one another and are electrically conductively connected to one another by a connecting element.

7. The apparatus according to claim 6, wherein a distance between adjacent feed sections and discharge sections is less than one tenth of a dimension of the star bridge.

8. The apparatus according to claim 7, wherein a distance between adjacent feed sections and discharge sections is less than 10 cm.

9. The apparatus according to claim 8, wherein the connecting element is electrically conductively connected to a ground connection via a ground connection line.

10. The apparatus according to claim 9, wherein the connecting element is manufactured in one piece, in particular as a cast component.

11. The apparatus according to claim 10, wherein the connecting element is manufactured in one piece with the tube inlet sections and the tube outlet sections.

12. The apparatus according to claim 8, wherein the connecting element is manufactured in one piece, in particular as a cast component.

13. The apparatus according to claim 7, wherein the connecting element is electrically conductively connected to a ground connection via a ground connection line.

14. The apparatus according to claim 7, wherein the connecting element is manufactured in one piece, in particular as a cast component.

15. The apparatus according to claim 6, wherein the connecting element is manufactured in one piece, in particular as a cast component.

16. The apparatus according to claim 15, wherein the connecting element is manufactured in one piece with the tube inlet sections and the tube outlet sections.

17. The apparatus according to claim 15, wherein the connecting element is manufactured as a cast component, wherein one end of the ground connection line is cast into the cast component.

18. The apparatus according to claim 16, wherein the connecting element is manufactured as a cast component, wherein one end of the ground connection line is cast into the cast component.

19. The apparatus according to claim 6, wherein a distance between adjacent feed sections and discharge sections is less than 10 cm.

20. The apparatus according to claim 6, wherein the connecting element is electrically conductively connected to a ground connection via a ground connection line.

* * * * *